Dec. 27, 1938.  L. LARSEN  2,141,539
BABY CARRIAGE
Filed April 13, 1936  3 Sheets-Sheet 1

Witness:
E. Camporini

Inventor:
Lewis Larsen,
Attorney.

Dec. 27, 1938.  L. LARSEN  2,141,539
BABY CARRIAGE
Filed April 13, 1936    3 Sheets-Sheet 2
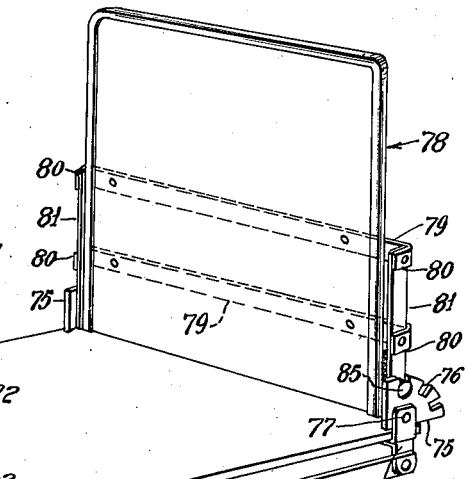
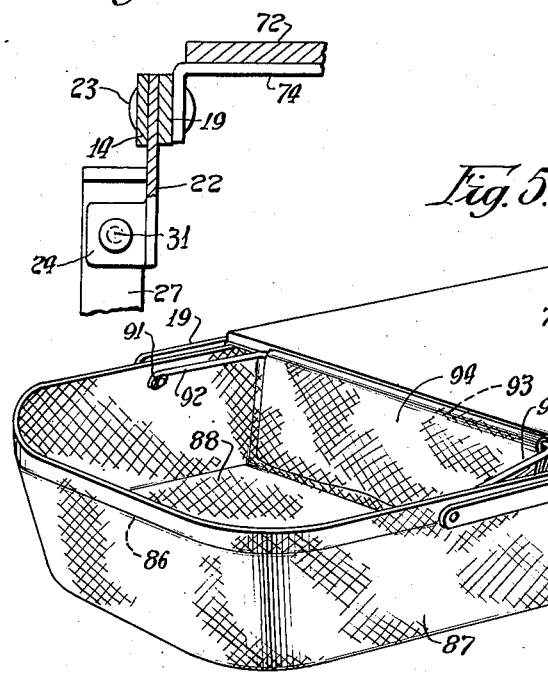
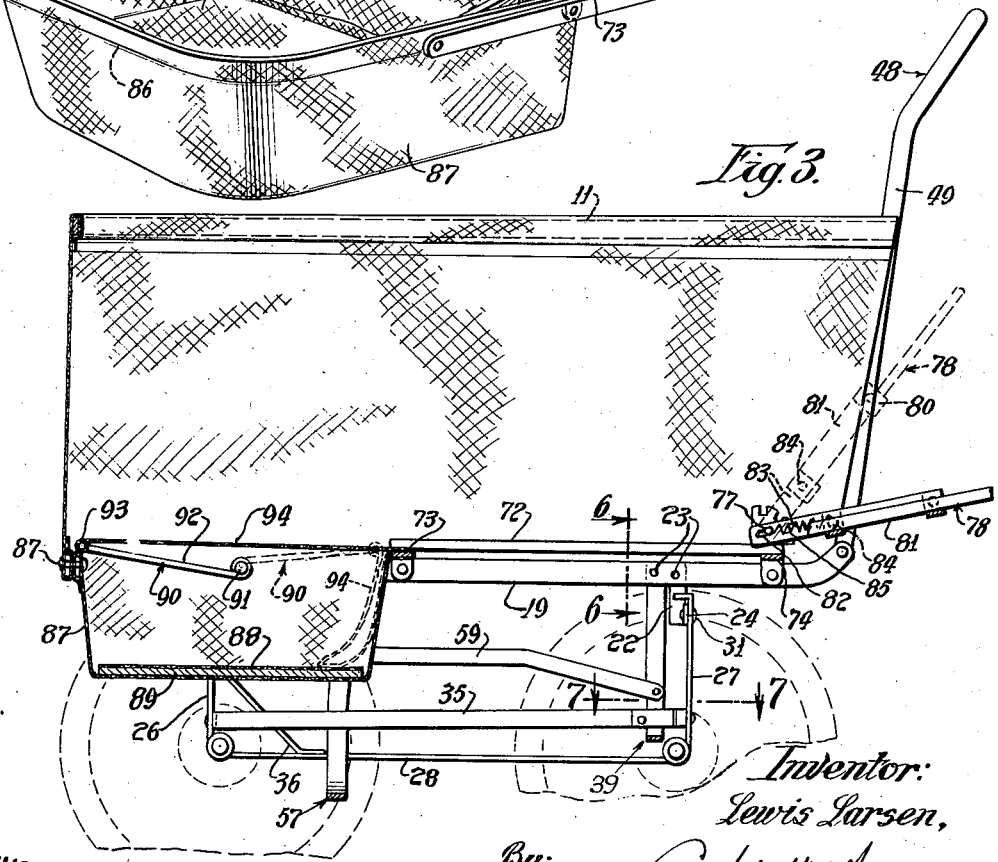
Inventor:
Lewis Larsen,
By:
Attorney.
Witness:
E. Camporini Dec. 27, 1938.　　　　L. LARSEN　　　　2,141,539
BABY CARRIAGE
Filed April 13, 1936　　　3 Sheets-Sheet 3
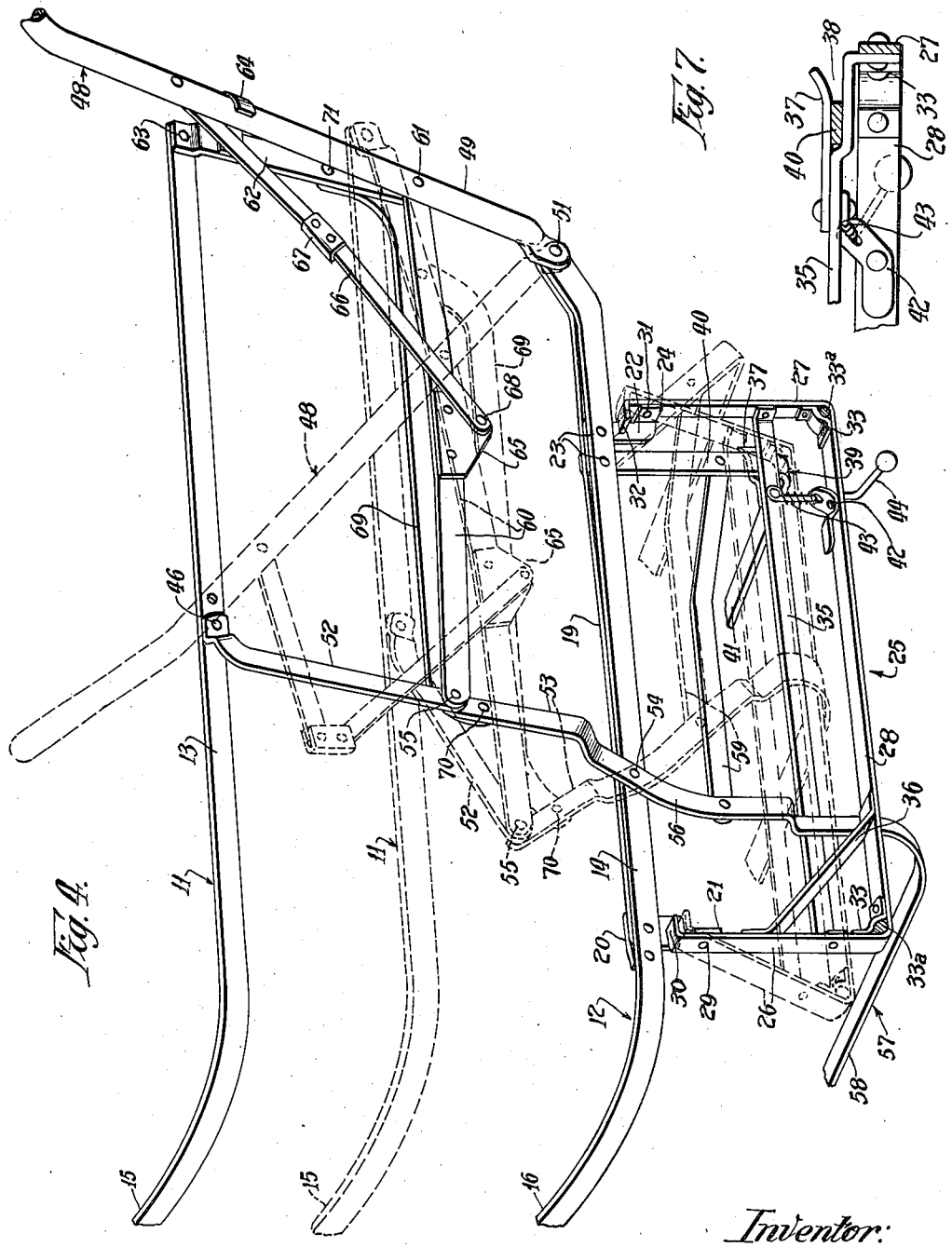

Patented Dec. 27, 1938

2,141,539

UNITED STATES PATENT OFFICE 2,141,539

BABY CARRIAGE

Lewis Larsen, Menominee, Mich., assignor to Heywood-Wakefield Company, Gardner, Mass., a corporation of Massachusetts Application April 13, 1936, Serial No. 74,089

2 Claims. (Cl. 280—39)

This invention relates to improvements in baby carriages and it consists of the matters hereinafter described and more particularly pointed out in the appended claims.

One of the objects of the invention is to provide a baby carriage which may be readily folded or collapsed into a compact condition and which may be readily opened up into an extended condition for use.

Another object of the invention is to provide a baby carriage in which the body may be folded or collapsed and the wheels may be swung under the folded or collapsed body by a forward and downward movement of the push handle.

A further object of the invention is to provide a baby carriage having a foldable or collapsible body which includes a coverable foot-well and an adjustable back whereby the body may be adjusted from a sitting posture for the baby occupant to a reclining one, conducive to comfortable sleeping.

Still another object of the invention is to provide a baby carriage of this kind which is not only of a modern appearance, but is indeed rigid in its extended condition; which is positively locked against accidental folding when the wheels engage an obstruction and which is relatively light in weight for easy carrying when folded or collapsed.

The above mentioned objects of the invention as well as others, together with the advantages thereof, will more fully appear as I proceed with my specification.

In the drawings:

Fig. 3 is a longitudinal vertical sectional view through the carriage when in its extended condition and illustrates the parts in a position permitting a reclining posture for the baby occupant.

Fig. 4 is a fragmentary perspective view on an enlarged scale, showing the structural elements embodied in substantially one side of the carriage.

Fig. 5 is a perspective view of the bottom structure of the carriage body as the same appears when removed from the body.

Fig. 6 is a detail vertical sectional view through a part of the carriage on an enlarged scale as taken on the line 6—6 of Fig. 3.

Fig. 7 is a detail horizontal sectional view through a part of the carriage on an enlarged scale as taken on the line 7—7 of Fig. 3.

Figure 1:
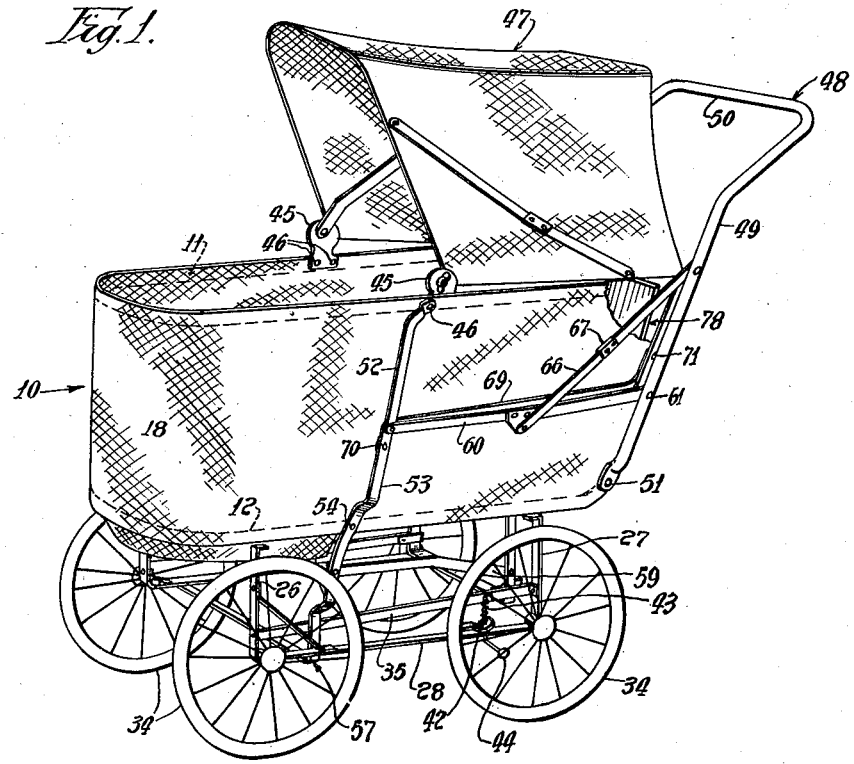
Fig. 1 is a perspective view of the carriage when in its extended condition ready for use.

Referring now in detail to that embodiment of the invention, illustrated in the accompanying drawings, the carriage includes a collapsible and extensible body which is indicated as a whole at 10 in Fig. 1. The body comprises top and bottom, horizontally disposed U shaped frames 11 and 12 respectively. Each frame which is made of vertically edgewise disposed strap iron, includes side members 13 and 14 respectively and front end connecting members 15 and 16 respectively. The top frame is somewhat longer than the bottom frame and as the front connecting members of both frames are disposed in the same perpendicular plane, the rear end of the top frame projects rearwardly beyond and overhangs the rear end of the bottom frame which there curves slightly upwardly. Associated with said frames is a body fabric 18 of good, strong material capable of folding into pleats. This fabric is provided with top and bottom hems to receive the side members and front connecting members of both frames 11 and 12. The said fabric extends around both sides and the front end only of the body. This leaves the body open at its rear end, which in side elevation takes on an upward and rearward inclination.

Associated with the body thus far described is a chassis frame which includes a pair of side bars 19—19 at the top. Said bars are also made of vertically edgewise disposed strap iron. Said bars are disposed along the inner face of the side members 14 of the bottom frame 12 and extend a suitable distance forward of the rear ends thereof and are secured thereto as will later appear.

Secured to and depending from the front end of each bar 19 is a bracket 20 bent to form a depending ear 21 which extends in a transverse plane. A bracket 22 is fixed to each bar 19 toward its rear ends, preferably by a pair of rivets 23. Each bracket is bent to form a depending ear 24 which also extends in a transverse plane. The ears 21—24 of the brackets 20 and 22 associated with each bar 19 has a wheel frame 25 pivoted thereto in such a manner that each wheel frame may be swung from its normal perpendicular position, inwardly and upwardly under the body. As the structures of both wheel frames are the same, a description of one will suffice for both.

Each wheel frame 25 which is made from a piece of strap iron bent into substantially U-shaped form, includes front and rear, normally perpendicular end posts 26—27 and a bottom horizontal reach bar 28 connecting the bottom ends of said posts. The front post 26 is pivotally connected at 29 to a front bracket ear 21 and includes a bent over ear 30 at the top, adapted to engage the outer face of the bracket 20 as a stop which limits the outward swing of the post and holds it in a perpendicular position. The rear post 27 is pivotally connected at 31 to a rear bracket ear 24 and includes a bent over ear 32 adapted to engage the outer face of the bracket 22, as a stop which limits the outward swing of the post and holds it in a perpendicular position.

In each corner of the wheel frame as provided by the junction of the posts and reach bar is fixed a substantially L-shaped bracket 33. Each bracket non-rotatively confines in its respective corner, an outwardly extending stub axle 33a upon which a wheel 34 is journalled. A wire spoked wheel is preferred. Extending between the posts of each frame 25 is a connecting bar 35. This bar is disposed to the inside of the wheel frame, a short distance above the brackets 33. To add rigidity to the wheel frame it may be advisable to provide an inclined brace 36 between the front post 26 and a suitable point on the reach bar. Associated with the rear end of said connecting bar and spaced inwardly therefrom is a spring finger 37 which coacts with said end of said bar in forming a bifurcation 38 as best shown in Fig. 7, the purpose of which will appear later.

It is apparent that each wheel frame may swing inwardly and upwardly under the body about the pivotal connections 29 and 31 for the posts 26 and 27 with the brackets 20 and 22. Means are provided for holding or locking said frames against such movement and such means is as follows:

39 indicates a U-shaped wheel frame locking member which includes arms 40—40 and a connecting member 41. The top end of each arm has a pivotal connection with the associated bar 19. This pivotal connection is provided by one of the rivets 23 which secure the associated rear bracket 22 to its bar. The arms 40—40 are spaced apart to accord with the spacing between the bifurcations 38 of both wheel frames when the wheel frames 25 are in their perpendicular positions. Thus when the member 39 is swung about its pivots, downwardly and forwardly, the arms 40—40 will enter their respective bifurcations or forks. The member 39 will then act to hold the bifurcations or forks in spaced apart relation so as to lock the wheel frames 25 in their upright positions. When the member 39 is swung upwardly and rearwardly, out of engagement with said bifurcations or forks, this permits said wheel frames to swing upwardly and inwardly so that the wheel frames fold up under the body.

On the reach bar 28 of one of the wheel frames, is pivoted a swingable arm 42. One end of said arm is engaged by the top end part 43 of a foot actuated lever 44. The top end part of said lever is pivoted at one end to the bar 35 and a spring is disposed between said lever arm and the pivot connection for said lever. The other end of said arm 42 is so formed that actuation of the lever in one instance, will swing the last mentioned end of the lever into a position to be engaged by one of the spokes of one of the wheels to act as a stop or brake therefor. When the lever is actuated in the other direction, this actuates the arm to withdraw the last mentioned end of the arm out of the plane of the spokes of the wheel so that the wheel is free to turn on its stub axle.

About midway between the ends of each side member of the body top frame, brackets 45 are secured as by a pair of rivets 46. These brackets operatively carry a foldable hood 47. As the structure of the hood forms no part of the present invention it is not believed necessary to illustrate or describe the same in detail.

The body structure before described is collapsible of foldable. In this respect, at each side of the rear end of the body is certain linkage arrangement connected to a push handle. The push handle forms a part of the linkage whereby the body may be collapsed, the top frame thereof moving toward the bottom frame. Associated with said linkage, is means operating upon the wheel frames to make them fold in under the body as the body collapses and which wheel frames swing into a perpendicular position when the body is returned or opened into its extended condition.

The linkage structure mentioned is the same on one side of the frame as the other so a description of the structure on one side will suffice for both.

At the rear end of the carriage is the usual push handle indicated as a whole at 48. This handle which is substantially of an inverted U-shape includes side arms 49 and a top connecting member 50. The bottom end of each arm of the handle is pivoted as at 51 to the rear end of the side members 14 of the body bottom frame 12. The side arms 49—49 take on the same inclination as the rear end of the body fabric 18.

At each side of the body and toward the rear end thereof is a suitable linkage arrangement which in one position, holds the body in its extended condition for use but which may be manipulated to permit the collapsing or folding of the top frame 11 down toward the bottom frame 12, with the body fabric 18 folding in between said frames as pleats.

52—53 indicate the top and bottom links of a pair of folding links which when the body is in its extended position, extend at an angle to the perpendicular in substantially the same inclination as the side arms of the push handle. The top end of the top link is pivotally connected to the side member 13 of the body top frame 11 and preferably one of the rivets 46 employed in attaching the hood bracket 47 thereto, is used for this purpose. The bottom link is pivotally connected at a point between its ends to the side member 14 of the body bottom frame 12 as by a pin 54. The links 52—53 are pivotally connected together at their meeting ends by a pin 55. The said bottom links are formed by the upper ends of the side arms 56 of a U-shaped wheel frame actuating member 57, the bottom ends of said arms being connected by a cross bar 58 through rounded corners. The side arms 56 pass the bars 35 on the outside thereof and the connecting member 58 is arranged beneath said bars. Each side arm 56 is connected by a link 59 with the corresponding arm 40 of the U-shaped wheel frame locking member 39.

The front end of a bar 60 is connected to the meeting ends of the links 52—53 by the same pin 55 which connects the meeting ends of said links together. When the body is in its extended position, this bar is horizontally disposed and its rear end is pivotally connected to the side arm 49 of the push handle by pin 61. This same pin is employed to connect the bottom end of a third link 62 to the side handle arm, the top end of said link being pivotally connected by a pin 63, to the rear end of the side member 13 of the body top frame. This third link which has substantially the same inclination as the links 52—53, coacts with the link 52, the bar 60 and the side member 13 of the top frame 11 in forming a parallel motion arrangement. The link carries a clip 64 to act as a stop for the side arm 49 of the push handle.

About midway between its ends, the bar 60 is provided with a depending bracket 65. A folding brace 66 with a rule joint 67 therein is pivotally connected at its bottom end to said bracket as at 68 and is pivotally connected at its top end to the push handle side arm 49 at a point above the top of the body.

In the plane of the bar 60 and between the same and the body fabric 18 is a link actuating bar 69. The front end of said bar has a down turned end which is pivotally connected as at 70 to the link 53 at a point a short distance below the pin 55. The rear end of said bar 69 is turned upwardly to be pivotally connected to the third link 62 at a point between its ends by a pin 71. By the provision of the bent ends for said link actuating bar, the same may be better concealed from view behind the bar 60 although if said link extended in a straight line between the pins 70 and 71, it would function in the same manner.

At the rear end of the bottom of the body and occupying substantially the rear half thereof is a seat 72 which includes a rigid base and suitable padding or upholstery. The seat base has transverse straps 73 and 74 secured to the underside of its front and rear ends and each strap has turned down ears which engage the inner face and are secured to the bars 19 before mentioned. Between the ends of the rear bar and the seat base are provided L-shaped brackets each including an upstanding segmental or arcuate portion 75 with a plurality of notches 76 in its edges. Concentric with the arcuate portion of each bracket and extending inwardly therefrom is a headed stud 77, the purpose of which will soon appear.

78 indicates the back rest member which includes a rigid base and suitable upholstery. Secured to the rear face of the back rest member is a pair of top and bottom transverse straps 79, the ends of which are bent to form forwardly extending ears 80. These ears are secured to arms 81. The bottom end of each arm has a longitudinal slot 82 therein, through which the bracket studs 77 extend to provide the axis about which the arms 81 and the back rest 78 carried thereby, may be swung from one position to the other.

A spring 83 is provided on the inside of the bottom end of each arm and this spring is secured at one end to the stud 77 and at its other end to a pin 84 on said arm. Said spring normally acts to pull the arms 81 downwardly. Each arm carries a headed stud 85 on the outside thereof for engagement in the desired notch 76 in the associated bracket part 75. By exerting an upward pull on the back rest, the studs 85 may be disengaged from one notch 76 in both brackets so that the back rest may be swung into the desired angular position as determined by a certain other notch to give the desired inclination to the back rest. As the springs 83 act to pull the back rest supporting arms downwardly, the back rest is releasably locked in the adjusted position. With the structure shown, the back rest may be swung from substantially an upright position into substantially a horizontal position wherein it forms a rear extension for the seat when it is desired that the baby occupant assume a reclining position for sleeping.

Secured to the ears of the cross member 73 and extending forwardly from the front of the seat to the front of the body, is a U-shaped frame 86 of strap iron. This frame is secured to the front member 16 of the body bottom frame 12 as by the rivet 87 appearing in Fig. 3. Secured to this frame and to the front strap of the seat is a foot well defining fabric 87. This fabric is provided at the top with a hem which encloses the said U frame and cross member 73. In the bottom of said well fabric is a pocket 88 in which is received a foot board 89 which gives a relatively flat bottom for the well.

About midway between the side members of the U frame 86, a bail 90 is pivoted on studs 91. This bail includes side arms 92 and a cross member 93 and to said cross member is secured one end of a well cover 94. The other end of said cover is secured between the front end of the seat and the well fabric and cross member 73. When the bail is swung rearwardly toward the seat, the cover fabric folds up to expose or uncover the well. When the bail is swung forwardly, its cross member 93 rests upon the front cross member of the U frame so that the fabric covers the well. In this position it forms a forward extension for the seat when it is desired that the baby occupant assume a position for sleeping.

Assume that the carriage is in the extended condition shown in Fig. 1 and it is desired to fold or collapse the same into a condition for storage or transport in an automobile. The hood 47 is first folded down or collapsed in the usual manner.

Figure 2:
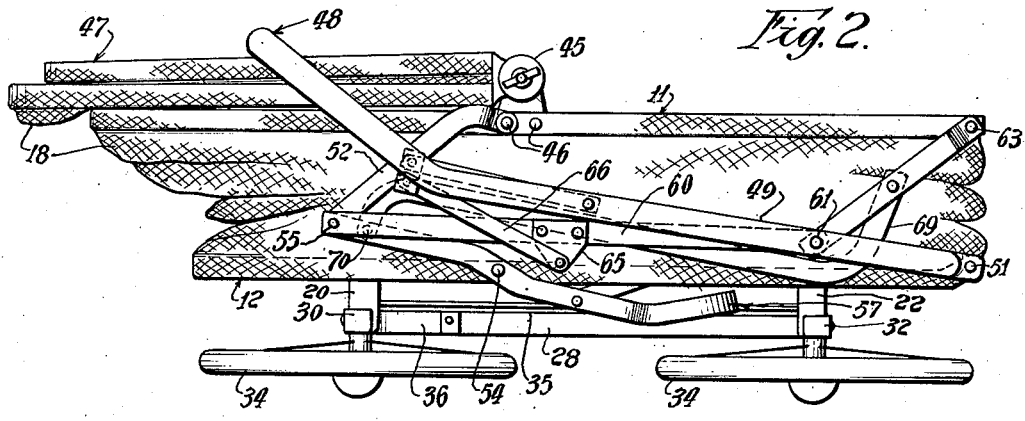
Fig. 2 is a view in side elevation of the carriage when in its folded or collapsed condition.

The braces 66 are then broken at their joints for folding after which the handle 48 as a whole is swung downwardly and forwardly toward the front end of the body. This through the bars 60 swings the links 52 forwardly and upwardly and swings the link parts 53 of the arms 56 of the wheel frame actuating member 57 forwardly and downwardly. The bottom arms 56 of said member 57 swings upwardly and rearwardly and through the bars 59 swing the wheel frame locking arms 39 rearwardly and upwardly out of engagement with the forks or bifurcations 38 at the rear end of the bars 35. This releases the wheel frames from their normally locked upright condition. In the further movement of the handle 48 downwardly and forwardly, the linkage causes the body to collapse and during this collapsing movement, the rounded corners of the member 57 engage the bars 35 and causes the wheel frames to swing inwardly under the collapsed body. As said wheel frames thus swing under the body, the foot well collapses upwardly to accommodate the front ends of the wheel frame. The parts are then in the position shown in Fig. 2.

To open the carriage into its extended condition for use, the cross bar 50 of the handle is grasped and the handle is swung upwardly and rearwardly.

In this movement of the handle, the braces 66 tend to straighten out and through the bars 60 open up the linkage to extend the body. At this time, the rounded corners of the U-shaped member 57 engage the reach bars 28 of the wheel frames and operate to swing them outwardly and downwardly into a perpendicular position. During the time the wheel frames approach this condition, the U-shaped member 39 swings downwardly and forwardly and so soon as the wheel frames approach said perpendicular position, the side arms 40 of said U-shaped member enter the bifurcations or forks 38 and lock the wheel frames in the upright condition.

About this time, the linkage for the body has extended the body and the side arms 49 of the handle 48 have approached their stops 64 on the links 62. The braces 66 at this time approach a substantially straight position. The operator now presses downwardly on the rule joint of the braces to swing them through and beyond the straight line condition as limited by the rule joints therein. The hood may now be opened up and the carriage is now in a condition for use.

It is to be noted that by a movement of the handle in one direction, the body is folded or collapsed and the wheel frames are first unlocked and then swung inwardly into a collapsed condition under the body. A movement of the handle in the other direction not only serves to extend the body but also to swing the wheel frames into their upright position and then lock them in that position.

While in describing the invention, I have referred in detail to the form, arrangement and construction of the various parts thereof, the same is to be considered only in the illustrative sense so that I do not wish to be limited thereto except as may be specifically set forth in the appended claims.

I claim as my invention:

1. A baby carriage embodying therein a collapsible body including rigid top and bottom frames and a foldable fabric therebetween, a wheel frame at each side of the body and connected to the bottom frame thereof for a swinging movement from an upright body supporting position to a folded position beneath said body, a push handle pivotally connected to the bottom frame for a swinging movement into and out of an operative position, front and rear sets of foldable links between the top and bottom frames of the body, a bar connecting the said sets of linkage, and operatively connected to the push handle, and means connected to said linkage and engaged with the wheel frame and operative when said linkage collapses the body to swing said wheel frames into a folded position beneath the body.

2. A baby carriage embodying therein a collapsible body including rigid top and bottom frames and a foldable fabric therebetween, a wheel frame at each side of the body and connected to the bottom frame thereof for a swinging movement from an upright body supporting position to a folded position beneath said body, a push handle pivotally connected to the bottom frame for a swinging movement into and out of an operative position, front and rear sets of foldable links between the top and bottom frames of the body, a bar connecting the said sets of linkage, and operatively connected to the push handle, means carried by said bottom frame and adapted for engagement with both wheel frames for locking the latter in their upright body supporting position, and means connected to said linkage and operative as the same collapses the body to release said locking means and to cause said wheel frames to swing into a folded position beneath the body.

LEWIS LARSEN.